May 25, 1971  NOBUHARU MORIYA  3,579,719

APPARATUS AND METHOD FOR MAKING SPHERICAL GRANULES

Filed Nov. 15, 1968  3 Sheets-Sheet 1

INVENTOR
NOBUHARU MORIYA
BY
ATTORNEY

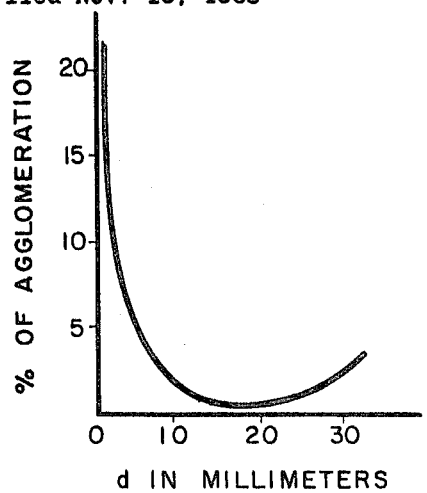
Fig. 9
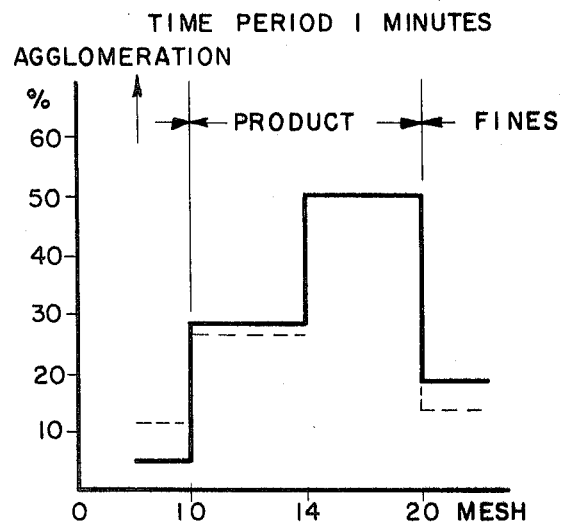
Fig. 10
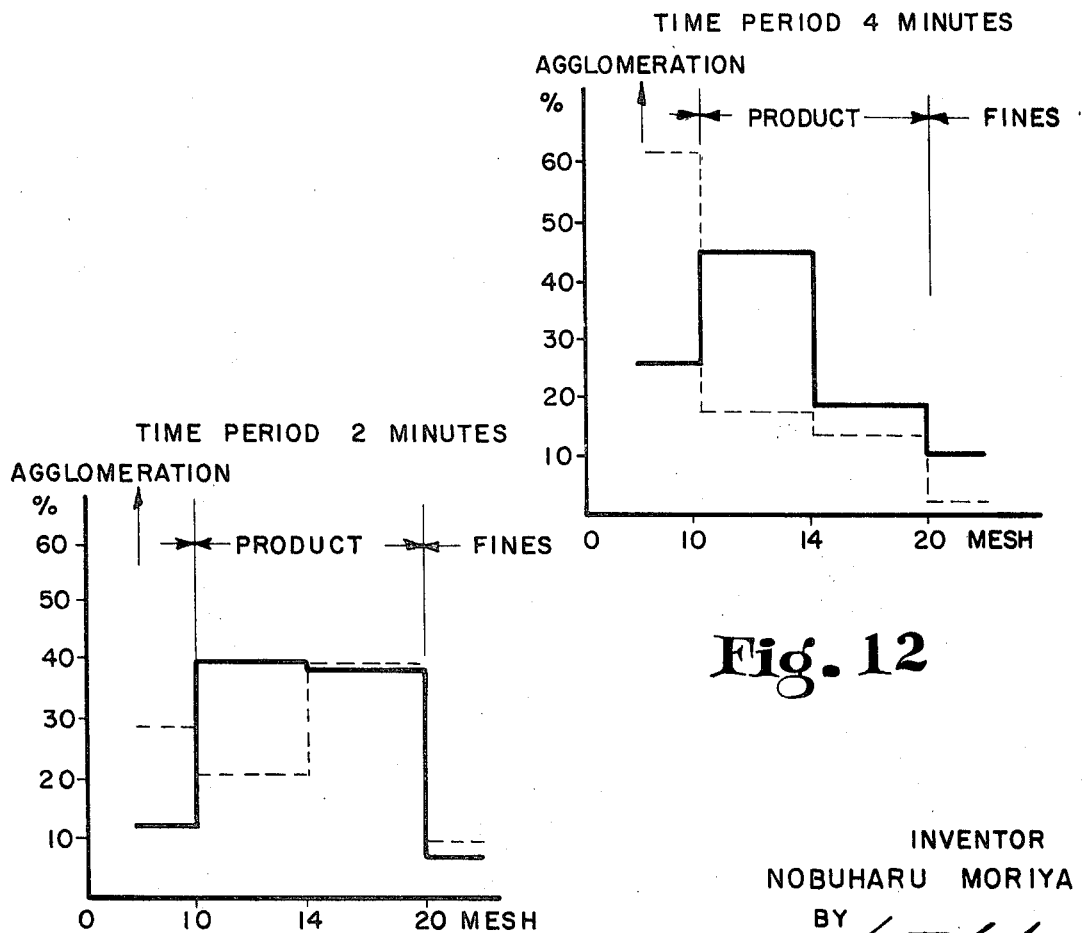
Fig. 11
Fig. 12

United States Patent Office 3,579,719
Patented May 25, 1971

3,579,719
APPARATUS AND METHOD FOR MAKING
SPHERICAL GRANULES
Nobuharu Moriya, Harakata, Japan, assignor to Fuji
Denki Kogyo Co., Ltd., Osaka, Japan
Filed Nov. 15, 1968, Ser. No. 776,080
Int. Cl. B29b 1/02
U.S. Cl. 18—1                                    3 Claims

ABSTRACT OF THE DISCLOSURE

A method and apparatus for converting pasty materials into spherical granules in which extruded segments are fed into a rotating indented plate which effects a centrifugal force on the segments. The rotating segments are retained within a cylindrical wall and a plurality of vertical and horizontal blades are counter-rotated to effect an undulating rotary force on the segments, transforming them into spherical granules.

BACKGROUND OF THE INVENTION

The present invention relates to a method and apparatus for making spherical granules from wetted cylindrical granules and is an improvement of the method and apparatus described in U.S. Pat. 3,277,520.

This invention, in the manufacture of a pesticide, for example, facilitates the convenience in the handling process and security as well as in the mixing and scattering process. By producing tiny and uniformly-sized spherical granules of an insecticide, pesticide, cattle feed, medicine and chemicals, as well as food stuff, etc., with my equipment, the handling process, mixing process and packaging process become very convenient. This invention also relates to facilitating an increase in product yield by preventing the wet pellets from being agglomerated and being crushed into fines in powdered form. Another object of this invention is to shorten the spheronizing time to one to two minutes, for instance, to remarkably increase the operation efficiency.

A further object of this invention is to simplify the mechanism of conventional spheronizing machines and also to simplify their operation. This means that pesticides in powdered form, for instance, are very inconvenient in causing a dusting problem when they are being removed from the bag, when transferring from one bag to another or when mixing and spreading. Sometimes such materials are harmful not only for humans but also for crops. By transforming these pesticides from powdered form to granular form, the convenience of handling and personal security are increased. It is preferable to effect a smooth surface on such granules in order to prevent the creation of powder dust that might otherwise result from the grinding action of rough granular surfaces. There is often a requirement that several kinds of the said granules be mixed for sale for which uniform-sized spherical pellets are preferable. In spite of such requirements as the aforementioned, it is difficult to obtain 90% or more of product yield in tiny spherical granules after sieving by a conventional machine. By the conventional method of spheronizing, the wet pellets tend to become lumps agglomerating each other during the operation, and high product yield could not be expected. It was also very difficult in conventional machines to make spheres due to the required regulating and predetermining the moisture content and amount of agglomerating agent resulting in increased difficulty in actual operation.

This invention can solve these problems and difficulties in the spheronizing process and leads to an easy control and operation in adding such moisture, agglomerating agents, etc.

SUMMARY OF THE INVENTION

By the present invention extruded cylindrical pellets of a predetermined diameter and in a wet state formed by the addition of an agglomerating agent to the material in its powdered form are charged into the apparatus. This apparatus comprises an indented rotating plate at the bottom of a cylinder, a horizontal dispersing arm spaced from the round indented plate and vertical stream-changing blades standing at both edges of the horizontal dispersing arm which rotate adjacently to the inner surface of the cylinder, and means to rotate the shaft of the indented plate at high speed while the horizontal dispersing arm and stream-changing blades rotate in the opposite direction at low speed.

Other objects and advantages of the invention including novel structural features will be apparent from the following description when read in connection with the accompanying drawing.

BRIEF DESCRIPTION OF THE DRAWING

FIG. 9 is a line graph showing an example of the relation to the clearance between the horizontally dispersing arm and rotating indented plate and the lumps generation ratio by agglomerating wet granules in accordance with a variation of the said clearance.

FIGS. 10, 11 and 12 are graphs based on working periods of one minute, two minutes and four minutes, respectively, showing the relationship of working time to product yield with and without the improvement of this invention.

DESCRIPTION OF THE PREFERRED EMBODIMENT

Figure 1:
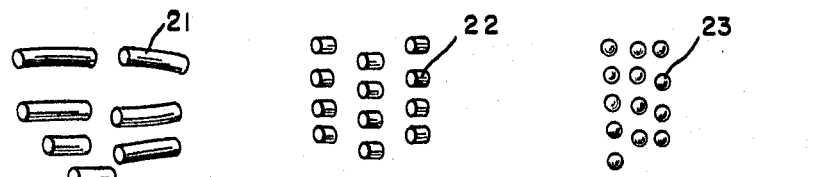
FIG. 1 illustrates the process of spheronizing by this invention.

Extruders are well known that produce cylindrical or the like pellets from various materials in powdered form. The shape of extrusions 21 as illustrated in FIG. 1 produced by such conventional machines is as long as more than ten times its diameter. This invention is to offer a method and apparatus to make spherical granules 22, as seen in FIG. 1(c) from the extruded granules 22 illustrated in FIG. 1(b). We now explain the method and apparatus relating to this invention with embodiments illustrated in FIGS. 2 through 12.

Figure 2:
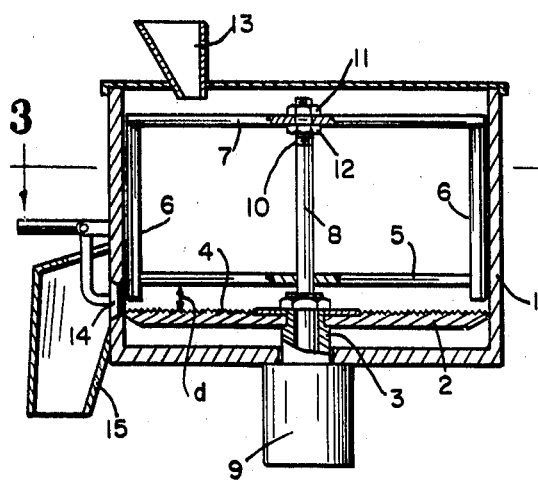
FIG. 2 is a sectional, side elevational view of the apparatus in accordance with this invention.
Figure 3:
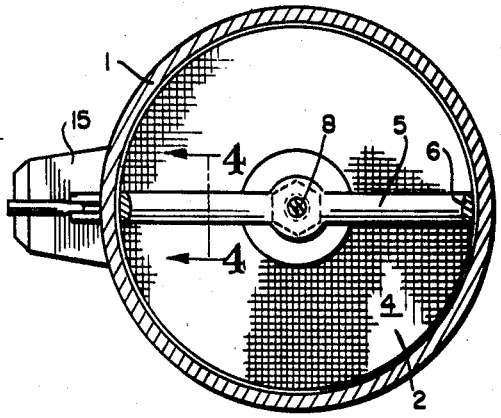
FIG. 3 is a plane view in horizontal section taken approximately on the line III—III in FIG. 2.
Figure 6:
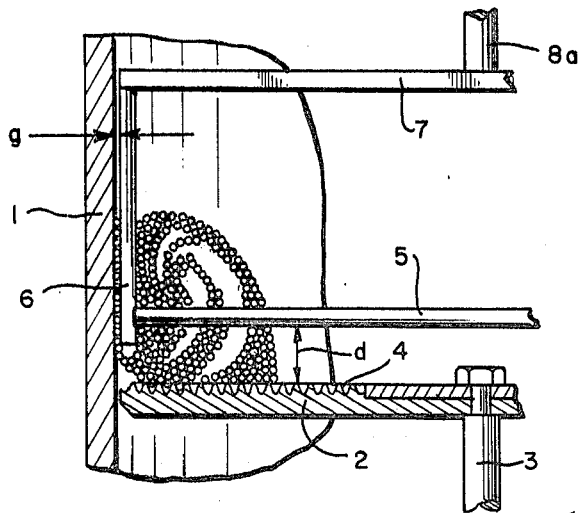
FIG. 6 is also a sectional, side-elevational view showing the turbulent motion of the pellets in the spheronizing process.

FIG. 2 is a sectional, side-elevational view of the apparatus in accordance with this invention. The apparatus is rotated at high speed by means of a first vertical shaft 3 having a rotating plate 2 at the bottom of cylinder 1. The upper surface of the rotating plate is cross grooved and the protruding parts 4 are of similar shape but not limited to that shown in FIG. 6. Spaced above the rotating plate 2 is a horizontal dispersing arm 5 and at both of its ends stream-changing blades 6 stand vertically adjacent to the inner surface of the wall of the cylinder. Horizontal dispersing arm 5 and stream-changing blades 6 are rotated at low speed by means of a second shaft 8 with support member 7 in an opposite direction to that of indented plate 2. The vertical shaft 8 and shaft 3 are driven in opposite directions, as seen in FIG. 2, by driving equipment 9 by means of a conventional gear assembly or the like. However, it also may be possible for the driving equipment mounted under the cylinder 1 to drive only the rotor of indented plate 2 and, as illustrated in FIG. 6, the horizontal dispersing arm 5 and stream-changing blades 6 may be driven from another source 8a above. The clearance d between the horizontal dispersing arm 5 and indented plate 2 is adjustable so as to be varied by means of nuts 11 and 12 and screw threads 10 upward of rotor 8 depending upon the adherence and physical nature of the agglomerating agent or materials in powdered form. Instead of this screw and nut method, the said adjustment may also be possible through use of a collar fixed to a suitable place fitted to rotor 8 or such other methods, for example, as an expansion mechanism on rotor 8. FIG. 2 illustrates a charge hopper 13, a product discharge opening lid 14 of cylinder 1 and a spherical product discharge chute 15.

Although the rotating speed of the indented plate 2 depends on the nature of the material or the like and the diameter, etc., to be spheronized, it is generally around 300 to 1500 r.p.m.; and the rotating speed of horizontal dispersing arm 5 and stream-changing blades 6 may be approximately 5 to 15 r.p.m.

Figure 4:
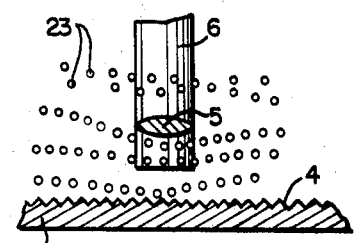
FIG. 4 is a side elevational view taken approximately on the line IV—IV in FIG. 2.

A generally desirable sectional shape of horizontal dispersing arm 5 is, as illustrated in FIG. 4, arc-shaped with its upper and lower parts expanding like the wing of a plane or a shape as smooth as possible for the fluid pressure. A sectional shape of stream-changing blade 6 is generally like a scraper for the inner surface of the wall of cylinder 1 and such as to change the pellet stream into the center part of indented plate 2. However, these shapes of horizontal dispersing arm 5 and stream-changing blades 6 may be varied in accordance with the nature and weight of the pellet to be charged.

Figure 5:
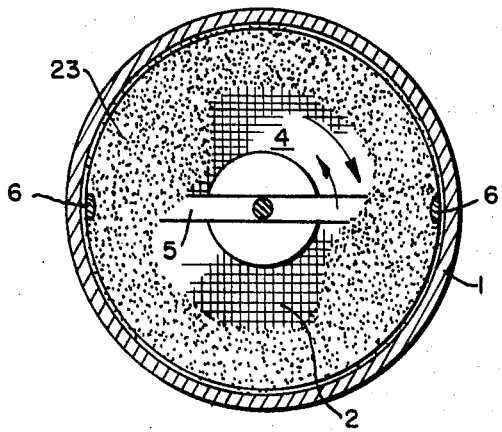
FIG. 5 is a plane view showing the turbulent motion of the pellets in the spheronizing process.

The operation of the comminuting process by our spheronizing equipment is as follows. As aforementioned, the material to be charged into the pelleter is already added with suitable agglomerating agents. The cylindrical wet extrusions 21 from the extruder have, as shown in FIG. 1, a length of about five to fifteen times their diameter and are also sticky. When such wet extrusions are fed into the apparatus of this invention, they are propelled into a rotary motion upon contacting the protuberances 4 on the rotating plate 2. This rotary motion is not planar and instead is an undulating rotary movement similar to a twisting rope. This fluid stream moves toward the inner surface of the wall of cylinder 1, as seen by the arrows in FIG. 6, by means of a centrifugal force from rotating indented plate 2 at a high speed and comes up along the inner surface of the wall and then falls down toward the center part of the indented plate from its top. That is to say, theoretically speaking, the twisting force and centrifugal force given to each pellet by means of protuberances 4 on the indented plate 2 and also the fluid pellet stream, as illustrated in FIGS. 5 and 6, by means of the resistance of the inner surface of cylindner 1 form a twisting rope movement.

If movement of the pellet stream is generated only by the high speed rotation of the indented plate 2 and the horizontal dispersing arm 5 and stream-changing blades 6 are omitted, the pellets moving inside in a circular path are rubbed by the inner surface of cylinder 1 and cut by the protuberances 4 of indented plate 2, causing rubbing of the pellets by each other to be transformed into spherical form.

However, these pellets have a considerable amount of stickiness because of the wet agglomerating agent, and for this reason they tend to adhere on the inner surface of the wall diagonally and are liable to produce a large-sized irregular spherical agglomerated mass which naturally results in very low product yield after discharge.

Although it is possible to minimize such phenomena by adding a predetermined exact amount of agglomerating agent to the material in powder form, the controls for adding the precise quantity of agglomerating agent to the material are very difficult when such vaporous liquids like water are used. In order to facilitate the convenience of the pelletizing process, it is particularly desirable to have a wide range of tolerances in the quantity of agglomerating agent and liquid to be added to the material in powdered form.

This invention can minimize the amount of unwanted agglomeration without having to maintain the moisture content within extremely narrow ranges. Horizontal dispersing arm 5 and stream-changing blades 6 effect two forces on the bed of pellets, causing it to rotate in a twisting, rotating fashion, turning the pellets into the center of indented plate 2. In other words, the horizontal arm 5, upon being rotated in a direction opposite that of indented plate 2 causes the upper portion of the bed of pellets to rise upward.

Similar to this effect, the pellets contacting with stream-changing blades 6 diverge from the stream and are directed toward the cylinder's center. That is to say, the direction of the pellets imparted by horizontal dispersing arm 5 and stream-changing blades 6 is toward the center part of indented plate 2, falling down directly on protuberances 4 of indented plate 2, and then into the lower part of the rotating fluid stream again. As shown in FIG. 5, the said rotating fluid stream spreads toward the center part of indented plate 2 after it encounters horizontal dispersing arm 5 and stream-changing blades 6. As illustrated in FIG. 6, on the other hand, some of the pellets appear to be flying in the air. These actions prevent the wet pellets from being agglomerated to each other in the rotating mass of pellets. Although the wet pellets are liable to adhere on the inner surface of cylinder 1 as aforementioned, stream-changing blades 6 prevent them from being adhesive and agglomerating on the inner surface of the wall of cylinder 1 by rotating with a narrow space between the said blades 6 and inner surface of the said wall. That is to say, the wet pellets adhered to the inner surface of the wall of cylinder 1 are dispersed by stream-changing blades 6 and no agglomeration or adherence can be seen on the inner surface of the cylinder.

The wet pellets falling down to the center part of indented plate 2 prevent the material in powdered form from sticking on the protuberances 4 of indented plate 2, since the pellets are crushed by protuberances and rolled, thereby transforming them into powdered form on the upper surface of indented plate 2 and the lower part of fluid pellet stream. Thus, the wet pellets falling down to the center part of indented plate 2 enter into the lower part of the rotating stream by centrifugal forces and onto the plate protuberances. They then agglomerate with the aforementioned powder which is very effective in preventing the outbreak of powder during operation. Another significant function of horizontal dispersing arm 5 is that, as seen in FIG. 4, the rotating fluid stream path of pellets becomes narrow between the indented plate and the horizontal dispersing arm. Thus, the rotating speed of the pellets is accelerated and the pellets are rolled by protuberances on the indented plate and suppressed by the horizontal dispersing arm. As the result of this insertion of horizontal dispersing arm 5 into the stream, the pellets are accelerated and dispersed behind the arm and then returned to the rotating stream again. This movement of pellets is effective in preventing the wet pellets from adhering to the indented plate 2 during the operation.

By this invention the charged wet pellets are prevented from becoming large lumps through agglomeration and, on the other hand, being crushed into powder by their impact on protuberances of the indented plate. Controlled crushing action and spheronizing action will be carried out simultaneously in this equipment, and spheronizing can be satisfactorily achieved within a very short time (generally, in one to two minutes) even if the permitted limit of agglomerating agent to be added to the material is expanded considerably.

Figure 7:
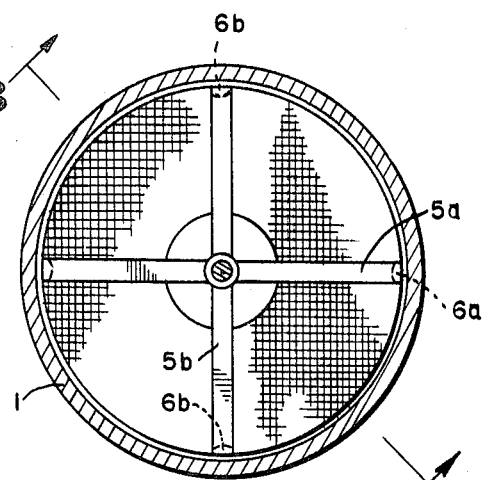
FIG. 7 is a sectional, side-elevational view of a second embodiment of this invention taken approximately on the line VII—VII in FIG. 8 which is a plane view of FIG. 7.
Figure 8:
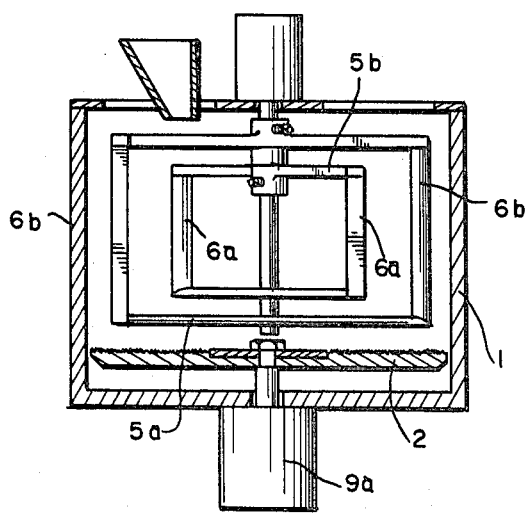

FIGS. 7 and 8 show a modified embodiment which comprises a two-stage horizontal dispersing arm arrangement. The equipment comprises first horizontal dispersing arm 5a with an adequate distance on indented plate 2, second horizontal dispersing arm 5b spaced above the first arm at an adequate distance and arranged in a crossed relationship to each other, and stream-changing blades 6a and 6b standing at both ends of first and second horizontal dispersing arms 5a and 5b, respectively, similar to the aforementioned embodiment. In this embodiment, indented plate 2 is driven by the driving device 9a located under the cylinder 1, and horizontal dispersing arms 5a and 5b and stream-changing blades 6a and 6b are driven in an opposite direction by the driving device 9b located above the cylinder 1. Horizontal dispersing arms 5a and 5b are, as illustrated, fixed on rotor 8 with bolts 16 and arranged to be adjustable in its height. The numbering is similar to FIGS. 1 through 6.

In this embodiment horizontal dispersing arms 5a and 5b are particularly effective in their two-stage crossed fashion to each other when the diameter of cylinder 1 and the processing capacity are increased, and the spheronizing effect and action are identical to that of FIGS. 1 through 6.

We will explain about our experiment on the equipment for granule spheronizing of the insecticide benzene hexachloride (BHC):

(a)

Ingredients of insecticide by weight:

|  | Percent |
|---|---|
| BHC (15% gamma) | 42 |
| Bentonite | 20 |
| Talc | 38 |

Cylindrical wet granules are obtained after an addition of 16% water to the above mixture.

(b)

|  | Mm. |
|---|---|
| Diameter of cylindrical pellets | 0.9 |
| Length of cylindrical pellets | 3 to 4 |

(c)

Specification of apparatus:
Diameter of indented plate—400 mm.
Number of protuberances on the indented plate—10 pcs./cm.$^2$ $$\frac{\text{Summit area of protuberance}}{\text{grooved area}} = \frac{1}{12}$$

Rotation of indented plate—800 r.pm.
Rotation of horizontal dispersing arms and stream-changing blades—10 r.p.m.
Charged quantity per batch—4 kg.
Clearance between horizontal dispersing arm and indented plate—20 mm.

Through our experiments with the aforementioned specification the width of the twisted doughnut-like fluid stream (refer to FIG. 5) is 90 to 100 mm., spheronizing time is two minutes and product yield 95% from 14 to 48 mesh (13 to 0.29 mm. dia.). To check the function of the stream-changing blades and horizontal dispersing arm, we added 20% water to the said mixture and tried to spheronize the extruded pellets with our equipment. Please note that 20% by weight moisture content caused a strong adherence and tended to agglomerate pellets to each other.

(a)

Ingredient of insecticide—same as aforementioned
Moisture content—20% by weight (b)

Diameter of cylidrical pellets—0.9 mm.
Length of cylindrical pellets—4 to 6 mm.

(c)

Specification of apparatus—same as aforementioned
Charged quantity of pellets per batch—4 kg.
Charged quantity of dry powder for preventing wet material from sticking on inner surface of cylinder—200 grams/batch With the above specification we experimented on our equipment, with and without the horizontal dispersing arm and stream-changing blades. The clearance $d$ between indented plate 2 and horizontal dispersing arm 5 was 20 mm.

When we experimented without the horizontal dispersing arm and stream-changing blades adherence on the inner surface of the cylinder was considerably high. It was found that the adherence was measured at 20% of the charge quantity after one minute, 40% after two minutes and 60% after four minutes; and the rest of the pellets flowed in a doughnut pattern on indented plate 2. On the other hand, with the blade assembly of our invention no adherence occurred on the cylinder's inner surface and upper surface of the rotating indented plate. From the above information, the efficiency gained by including this new assembly on our apparatus became very clear. Furthermore, you may refer to the spherical granule size distribution in FIGS. 10, 11, and 12 which were obtained through our sampling at random after one minute, two minutes and four minutes operation. The solid lines illustrate the results obtained with our novel blade assembly, and the dotted lines are the results of omitting the blade assembly. FIG. 10 shows the pellet size distribution after one minute operation, FIG. 11 shows after two minutes and FIG. 12 shows after four minutes operation.

From these results we can say the following information:

(1) The arm 5 and blades 6 are very effective for preventing wet material from sticking on the inner surface of cylinder 1 and to the upper surface of indented plate 2.

(2) It was found that breakout of fine powder is minimized.

(3) Pellet forming results seem to be quite different without these improvements.

(4) As seen in FIG. 12, this device greatly delays the unwanted agglomeration of wet material as compared to the results obtained without the device.

The following experiment illustrates the desirability for being able to adjust the distance $d$ between horizontal dispersing arm 5 and indented plate 2:

(a)

Ingredients of the insecticide are similar to those of the previous experiments and water content is 17% by weight.

(b)

Diameter of cylindrical pellets—0.8 mm.
Length of cylindrical pellets—3 to 4 mm.

(c)

Diameter of indented plate 2 and other specifications are also the same as those of the previous experiments but rotation of indented plate 5 is 590 r.p.m.

Although the spheronizing time actually required was two minutes, we operated for four minutes to check adherence and agglomeration.

The results of FIG. 9 of this experiment were obtained by varying the clearance between indented plate 2 and horizontal dispersing arm 5 to 0, 10, 20 and 30 mm. in order from which it is apparent that the optimum clearance is 20 mm., resulting in an agglomerating ratio of 0.46%. It is apparent that a clearance $d$ between the horizontal dispersing arm and the indented plate is necessary. Equally good results in product yield may be obtained from a variety of material in pasty form in addition to the above-mentioned insecticide preparation. In conclusion, the subject matter of this invention relates to a method and apparatus for producing required sizes of spherical granules of insecticide, medicine, etc., at high product yield from cylindrical, columnar, cubic, or the like granules, and at the same time preventing wet material from being adhesive and agglomerative and from being crushed into powder form.

I claim:

1. Spherical granule-making apparatus comprising a vertical cylinder having an opening for receiving material and a discharge opening, first and second shafts rotatably mounted in said cylinder, an indented plate mounted horizontally on said first shaft at the bottom of said cylinder, a horizontal dispersing arm radially positioned on said second shaft and extending equidistant therefrom and parallel to said indented plate, first and second vertical stream-changing blades connected at one extreme to opposite ends of said horizontal dispersing arm in close proximity to the inner wall of said cylinder, the other extreme of each of said stream-changing blades fastened to a horizontal support arm, said vertical stream-changing blades being in close proximity to the inner wall of said cylinder to effect wiping contact on material adhering to the inner wall, said vertical stream-changing blades defining large open spaces therebetween of sufficient size to permit falling of material therethrough onto said indented plate, said horizontal dispersing arm adapted for counter rotary action relative to said rotary indented plate.

2. The apparatus defined in claim 1 in which said first and second shafts are coaxially aligned.

3. The apparatus defined in claim 2 in which a second like assembly of a horizontal dispersing arm and vertical blades is positioned on said second shaft at right angles to said first assembly of a horizontal dispersing arm and vertical blades.

References Cited

UNITED STATES PATENTS

| 1,040,769 | 10/1912 | Sackett | 241—103 |
| 2,243,384 | 5/1941 | Lehrecke | 18—1 |
| 3,277,520 | 10/1966 | Nakahara | 18—1 |
| 3,461,487 | 8/1969 | Miller | 18—1 |

RICHARD J. HERBST, Primary Examiner